United States Patent
Shah (10) Patent No.: US 10,902,411 B2
(45) Date of Patent: Jan. 26, 2021

(54) HOST-FORMATTED SELECT PROXIMITY PAYMENT SYSTEM ENVIRONMENT RESPONSE

(71) Applicant: GOOGLE LLC, Mountain View, CA (US)

(72) Inventor: Hiteshkumar M. Shah, Plano, TX (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/278,785

(22) Filed: Feb. 19, 2019

(65) Prior Publication Data
US 2019/0180268 A1   Jun. 13, 2019

Related U.S. Application Data

(63) Continuation of application No. 14/835,695, filed on Aug. 25, 2015, now Pat. No. 10,242,356.
(Continued)

(51) Int. Cl.
*G06Q 20/32* (2012.01)
*G06Q 20/20* (2012.01)
(Continued)

(52) U.S. Cl.
CPC ......... *G06Q 20/3278* (2013.01); *G06Q 20/20* (2013.01); *G06Q 20/202* (2013.01);
(Continued)

(58) Field of Classification Search
CPC .. G06Q 20/3278; G06Q 20/356; G06Q 20/20; G06Q 20/36; G06Q 20/3227; G06Q 20/202
See application file for complete search history.

(56) References Cited

U.S. PATENT DOCUMENTS 8,196,131 B1 * 6/2012 von Behren ....... G06Q 20/3563
717/168
10,242,356 B2   3/2019 Shah
(Continued)

OTHER PUBLICATIONS

Rodrigues H, José R, Coelho A, et al. MobiPag: integrated mobile payment, ticketing and couponing solution based on NFC. Sensors (Basel). 2014;14(8):13389-13415. Published Jul. 24, 2014 (Year: 2014).*
(Continued)

*Primary Examiner* — Ashford S Hayles
(74) *Attorney, Agent, or Firm* — Dority & Manning, PA (57) ABSTRACT

Informing near field communication (NFC) payment readers of NFC target device payment application availability. A payment application executing under a host operating system of an NFC target device formats a SELECT proximity payment system environment (PPSE) RESPONSE as one or more NFC Application Protocol Data Units (APDUs). The SELECT PPSE RESPONSE is formatted to respond to a SELECT PPSE command from an NFC payment reader. The SELECT PPSE RESPONSE includes a list of one or more Application Identifiers (AIDs) corresponding to one or more payment options available on the NFC target device. The payment application communicates the formatted SELECT PPSE RESPONSE to a PPSE applet executing on the NFC target device. The PPSE applet receives a SELECT PPSE command from an NFC payment reader. The PPSE applet communicates the SELECT PPSE RESPONSE to the NFC payment reader, in response to receiving the SELECT PPSE command from the NFC payment reader.

17 Claims, 5 Drawing Sheets

Related U.S. Application Data (60) Provisional application No. 62/041,326, filed on Aug. 25, 2014.

(51) Int. Cl.
*G06Q 20/36* (2012.01)
*G06Q 20/34* (2012.01)

(52) U.S. Cl.
CPC ....... *G06Q 20/3227* (2013.01); *G06Q 20/356* (2013.01); *G06Q 20/36* (2013.01)

(56) References Cited

U.S. PATENT DOCUMENTS

| | | | |
|---|---|---|---|
| 2004/0068472 A1* | 4/2004 | Sahota | G06Q 20/3674 705/64 |
| 2008/0129450 A1* | 6/2008 | Riegebauer | G06Q 20/3576 340/5.86 |
| 2010/0330904 A1* | 12/2010 | Stougaard | H04L 67/12 455/41.1 |
| 2012/0109764 A1* | 5/2012 | Martin | G06Q 20/204 705/17 |
| 2012/0129452 A1* | 5/2012 | Koh | G06Q 20/352 455/41.1 |
| 2013/0052949 A1* | 2/2013 | Yang | H04W 4/50 455/41.1 |
| 2013/0103514 A1* | 4/2013 | Fisher | G06Q 20/00 705/18 |
| 2013/0303085 A1* | 11/2013 | Boucher | H04W 4/80 455/41.1 |
| 2014/0058937 A1* | 2/2014 | Watson | G06Q 20/4012 705/41 |
| 2014/0250006 A1* | 9/2014 | Makhotin | G06Q 20/3227 705/41 |
| 2015/0020160 A1* | 1/2015 | Goncalves | G06Q 20/3227 726/3 |
| 2015/0112860 A1* | 4/2015 | Wang | G06Q 20/322 705/39 |
| 2015/0186864 A1* | 7/2015 | Jones | G06Q 20/405 705/39 |
| 2015/0327071 A1* | 11/2015 | Sharma | H04L 63/102 726/6 |
| 2016/0042338 A1 | 2/2016 | Jooste | |
| 2016/0057619 A1* | 2/2016 | Lopez | G06F 9/455 380/247 |
| 2016/0140535 A1* | 5/2016 | Noe | G06Q 20/405 705/39 |

OTHER PUBLICATIONS

T. Ali and M. A. Awal, "Secure mobile communication in m-payment system using NFC technology," 2012 International Conference on Informatics, Electronics & Vision (ICIEV), Dhaka, 2012, pp. 133-136. (Year: 2012).*

M. Roland, J. Langer and J. Scharinger, "Applying relay attacks to Google Wallet," 2013 5th International Workshop on Near Field Communication (NFC), Zurich, 2013, pp. 1-6. (Year: 2013).*

U. B. Ceipidor, C. M. Medaglia, A. Marino, S. Sposato and A. Moroni, "KerNeeS: A protocol for mutual authentication between NFC phones and POS terminals for secure payment transactions," 2012 9th International ISC Conference on Information Security and Cryptology, Tabriz, 2012, pp. 115-120. (Year: 2012).*

M. Alattar and M. Achemlal, "Host-Based Card Emulation: Development, Security, and Ecosystem Impact Analysis," 2014 IEEE Intl Conf on High Performance Computing and Communications, 2014 IEEE 6th Intl Symp on Cyberspace Safety and Security, 2014 (Year: 2014).*

Hayles, "U.S. Office Action issued in copending U.S. Appl. No. 14/835,695, filed Aug. 25, 2015", dated Jan. 26, 2018, 14 pages.

Hayles, "U.S. Office Action issued in copending U.S. Appl. No. 14/835,695, filed Aug. 25, 2015", dated Jul. 31, 2018, 15 pages.

U.S. Appl. No. 14/835,695 to Hiteshkumar M. Shah filed Aug. 25, 2015.

* cited by examiner

Format, by a payment application executing under a host operating system of an NFC target device, a SELECT PPSE RESPONSE as one or more NFC APDUs
210

---

Communicate, by the payment application, the formatted SELECT PPSE RESPONSE to a PPSE applet executing on the NFC target device
220

---

Receive, by the PPSE applet, a SELECT PPSE command from an NFC payment reader
230

---

Communicate to the NFC payment reader, by the PPSE applet in response to receiving the SELECT PPSE command from the NFC payment reader, the SELECT PPSE RESPONSE communicated to the PPSE from the payment application
240

Format, by a payment application executing under a host operating system of an NFC target device, a SELECT PPSE RESPONSE as one or more NFC APDUs
210

220

Communicating, by the payment application, the formatted SELECT PPSE RESPONSE to a wallet applet executing on the SE
322

Updating, by the wallet applet, a wallet applet table of allowed payment AIDs
324

Communicating, by the wallet applet to the PPSE applet, the SELECT PPSE RESPONSE communicated to the wallet applet
326

Receive, by the PPSE applet, a SELECT PPSE command from an NFC payment reader
230

Communicate to the NFC payment reader, by the PPSE applet in response to receiving the SELECT PPSE command from the NFC payment reader, the SELECT PPSE RESPONSE communicated to the PPSE applet from the payment application
240

Format, by a payment application executing under a host operating system of an NFC target device, a SELECT PPSE RESPONSE as one or more NFC APDUs
210

220

Communicating, by the payment application, the formatted SELECT PPSE RESPONSE to the PPSE applet directly as one or more APDUs
422

Receive, by the PPSE applet, a SELECT PPSE command from an NFC payment reader
230

Communicate to the NFC payment reader, by the PPSE application in response to receiving the SELECT PPSE command from the NFC payment reader, the SELECT PPSE RESPONSE communicated to the PPSE applet from the payment application
240

HOST-FORMATTED SELECT PROXIMITY PAYMENT SYSTEM ENVIRONMENT RESPONSE

CROSS REFERENCE TO RELATED APPLICATIONS

This application is a continuation application of U.S. patent application Ser. No. 14/835,695 filed on Aug. 25, 2015 and entitled "Host-Formatted Select Proximity Payment System Environment Response," which claims priority to U.S. Provisional Patent Application No. 62/041,326, filed Aug. 25, 2014 and entitled "Systems, Methods, and Computer Program Products for Managing Commands." The complete disclosure of the above-identified priority applications is hereby fully incorporated herein by reference.

TECHNICAL FIELD

The technology disclosed herein relates to near field communication (NFC). Example embodiments relate to the interfaces and operations of a Proximity Payment System Environment (PPSE).

BACKGROUND

NFC is a short-range radio frequency (RF) communication technology, typically operating at a distance of 10 cm or less between two communicating devices. Communication under NFC involves an initiator device (often referred to as a "reader") and a target device.

In a simple NFC communication configuration, the reader can generate an RF field that can power a target that does not require batteries. This enables use of an NFC target having a simple form such as a tag, a sticker, a key fob, or a smart card. Simple NFC targets are typically read-only and directed to a single application, for example, a single-purpose contactless smart card used for payment in connection with a credit card account. In addition to payment, NFC targets have found use in application areas such as ticketing, access, RF identification (REID) tags, loyalty programs, and coupons.

In a more sophisticated NFC communication configuration, a secure element (SE) installed in a "host" device, such as a mobile phone, can emulate an NFC target. An SE is a tamper-resistant hardware platform, capable of securely running SE applications and storing confidential and cryptographic data. An SE can be included in the subscriber identity module (SIM) or universal integrated circuit card (UICC) of a mobile device (the host) as an embedded SE (eSE). An SE can also by installed in a secure digital (SD) card that can be inserted in to a mobile device. An NFC controller in the mobile device handles communication between the SE and an NFC reader. Such an arrangement allows the SE to emulate a smart card.

Host-based card emulation (HCE), more often simply "Host Card Emulation," is a technology that allows an NFC-enabled host device, such as a mobile phone, to appear as an NFC target to an NFC reader, without relying on a conventional passive NFC target or an SE. In a typical HCE implementation, the NFC controller, also referred to as a contactless front end (CLF), can interface with an application running under the operating system (OS) of the host. For example, a mobile phone can run a mobile wallet payment application under the phone's OS. The mobile wallet payment application can communicate with an NFC-enabled point of sale (POS) device via the CLF.

Whether using an SE or HCE, operating multiple contactless NFC-enabled applications on a single target device presents several challenges, including the selection of which application to run in a given context in response to interrogation of the target device by a reader. One way to accomplish such selection is by use of an NFC application identifier (AID). The target device maintains a routing table that lists AIDs for the applications on the device, typically in the NFC controller. When the target device receives a request to select an application ("SELECT AID" command using an AID as an argument) from a reader, the target device searches for the AID in its routing table.

A typical AID includes up to sixteen 8-bit bytes. Bits 8 to 5 of the first byte indicate a category from among "international," "national," "standard," and "proprietary." Both the international and national AID format allocate the first five (5) bytes to a "registered application provider identifier," and up to an additional eleven (11) bytes to a proprietary application identifier extension. For a standard category AID, the first byte is set to "E8." An object identifier follows for identifying a standard specifying an application. An application identifier extension (specified according to the identified standard) may follow for identifying different implementations. A proprietary AID includes up to sixteen (16) bytes, with bits 8 to 5 of the first byte set to "F." In the proprietary category, as application providers are not registered, different application providers may use the same AID.

In the NFC payment application area, an additional feature exists to allow an NFC reader to determine which NFC-enabled payment applications are available on a target device brought into proximity with the reader. The Proximity Payment System Environment (PPSE) is an applet that may execute on the target device and may be used by the reader to determine which of the active applications on a target device should be used for payment. The PPSE collects data on each NFC-enabled payment application executing on the target device, and forms a SELECT PPSE RESPONSE. The SELECT PPSE RESPONSE contains the AID for each payment application that the target device may make available to an NFC reader. The SELECT PPSE RESPONSE also may contain name, preference, and option information related to the payment applications that the target device might make available to the NFC reader. For example, the PPSE SELECT RESPONSE may contain various type length value (TLV) structures including file control information (FCI) Template and FCI proprietary template arranged in an industry defined format.

When the NFC reader first detects the proximity of the target device, the NFC reader issues a SELECT PPSE command to the target device. The PPSE responds to the SELECT PPSE command with the SELECT PPSE RESPONSE. Based on the SELECT PPSE RESPONSE and optional further interaction between the POS Device, the NFC target, and the user, a transaction with a specific payment option compatible with both the POS device and the NFC target can be completed.

SUMMARY

Methods, computer program products, and system for informing near field communication (NFC) payment readers of NFC target device payment application availability are disclosed herein. In embodiments of the disclosed technology, a payment application executing under a host operating system of an NFC target device formats a SELECT proximity payment system environment (PPSE) RESPONSE as one or more NFC Application Protocol Data Units (AP- DUs). The SELECT PPSE RESPONSE is formatted to respond to a SELECT PPSE command from an NFC payment reader. The SELECT PPSE RESPONSE includes a list of one or more Application Identifiers (AIDs) corresponding to one or more payment options available on the NFC target device.

The payment application communicates the formatted SELECT PPSE RESPONSE to a PPSE applet executing on the NFC target device. The PPSE applet receives a SELECT PPSE command from an NFC payment reader. The PPSE applet communicates the SELECT PPSE RESPONSE to the NFC payment reader, in response to receiving the SELECT PPSE command from the NFC payment reader.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

A PPSE applet executing on an SE in an NFC-enabled mobile communication device has access to only the memory and processing capacity of the SE, which can be quite limited. These limitations can manifest as latency, which can be detrimental to the user experience. Using and relying on the technology described herein mitigates the effect of latency attributable to a PPSE applet forming a SELECT PPSE RESPONSE by forming the response in a wallet application executing under the host operating system. The host, including its operating system and hardware, typically operates much faster than an SE and has access to more and faster memory than an SE. Even if the PPSE is executing under the host operating system, forming the SELECT PPSE RESPONSE outside the PPSE, and allowing direct writing of the SELECT PPSE RESPONSE to the PPSE can decouple wallet application changes from the PPSE. As such, the systems and methods described herein may be employed to allow the PPSE, which must operate with a wide variety of different wallet applications, to be more independent of the particular wallet application.

Turning now to the drawings, in which like numerals represent like (but not necessarily identical) elements throughout the figures, example embodiments are described in detail.

Example System Architectures

In example architectures for the technology, while each device shown in the architecture is represented by one instance of the device, multiple instances of each can be used. Further, while certain aspects of operation of the present technology are presented in examples related to the figures to facilitate enablement of the claimed invention, additional features of the present technology, also facilitating enablement of the claimed invention, are disclosed elsewhere herein.

Figure 1:
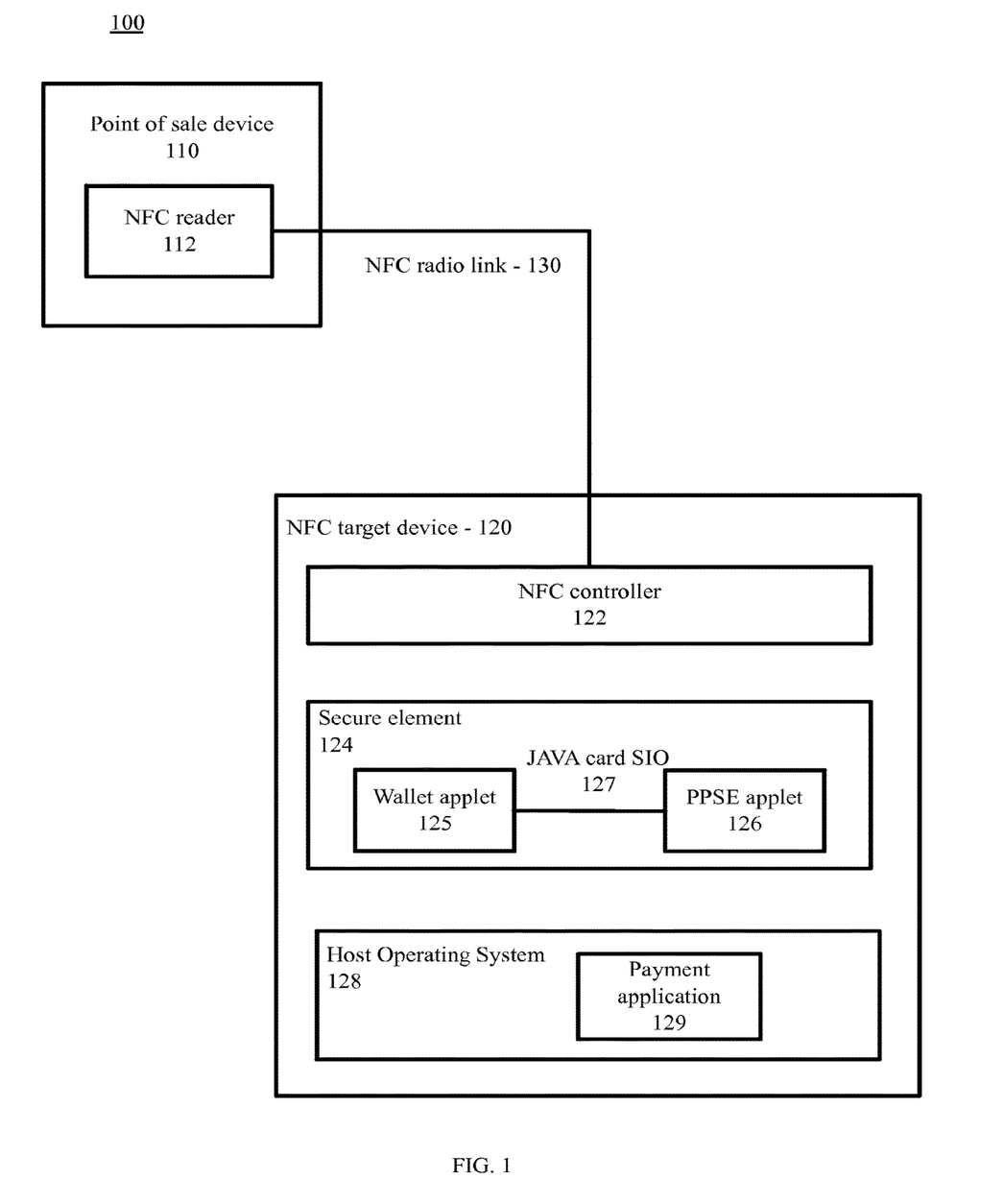
FIG. 1 is a block diagram depicting a communications and processing architecture in accordance with certain example embodiments.

As depicted in FIG. 1, architecture 100 includes POS device 110 and NFC target 120. The POS device 110 and the NFC target can be in communication over an NFC radio link 130 when the NFC target 120 is in close proximity (typically <10 cm) to the POS device 110.

The POS device 110 includes an NFC reader 112. The NFC reader 112 can generate an RF field that supports an NFC radio link 130 with an NFC target 120. The NFC reader 112 is then operable to communicate with the NFC target 120 to execute operations such as a payment transaction, control of access, and verification of identity.

The NFC target 120 can include a NFC controller 122, a secure element (SE) 124, and a host operating system 128. The NFC controller 122 can control the transmission of data over the NFC radio link 130, allowing the NFC target 120 to communicate with the NFC reader 112. The NFC controller 122 includes procedures that establish, configure, and maintain the NFC target 120. The NFC controller 122 reacts to messages from the NFC reader 112, from the SE 124 (and applications executing therein, such as PPSE 126), and from one or more HCE applications (such as payment application 129) executing in the target operating system 128. As described above, the NFC controller 122 can use an AID-based routing table to route NFC messages, each message called an Application Program Data Unit (APDU), between the POS device 110 and an NFC application. Such NFC applications include wallet applet 125 or PPSE applet 126 executing on the SE 124 of the NFC target 120, and a payment application 129 executing under the host operating system 128 of the NFC target 120. In some embodiments, a user associated with one or both of the POS device 110 and the NFC target 120 a must install an application and/or make a feature selection to obtain the benefits of the technology described herein.

Throughout the discussion of example embodiments, it should be understood that the terms "data" and "information" are used interchangeably herein to refer to text, images, audio, video, or any other form of information that can exist in a computer-based environment. Additionally, those having ordinary skill in the art and having the benefit of this disclosure will appreciate that the elements illustrated in FIG. 1 may have any of several other suitable computer system configurations. For example, the NFC target 120 can be embodied as a mobile phone or handheld computer. In some embodiments, a merchant can operate the POS device 110, and a customer can operate a mobile phone as the NFC target 120.

Typically, a payment application 129 executing under a host operating system 128 sends tags such as AID, application label, and priority indicator, to a wallet applet 125 executing on the SE 124 through on or more APDUs. The wallet applet 125 parses the APDU content for tags and their values, checks the tags for compliance with standards, updates its own table of allowed payment AIDs, and then passes the information to the PPSE 126. For example, the wallet applet 125 can pass the information to the PPSE 126 through an internal Java Card sharable interface objects (SIO) interface. The PPSE applet 126 receives these tags and values, and processes the tags and values to arrange them in a proper format to construct and set its PPSE SELECT RESPONSE. Wallet applets 125 also perform operations related to the payment application that must be performed in a secure environment.

If the wallet applet 125 receives tags that it is not programmed to accept, it will return an error. Similarly, the wallet applet 125 can return an error if tags are found missing compared to what the wallet applet 125 is programmed to check. If at any time a need arises to add or remove a tag in PPSE SELECT RESPONSE, the wallet applet 125 and the PPSE 126 will be updated. This approach can lead to a less favorable user experience due to latency introduced by multiple stages of communication and the limited processing resources in the SE 124 compared to those in available to the host operating system 128. Further, a change in the presence or absence of a tag in PPSE SELECT RESPONSE may be required to accommodate changes in functionality provided by payment applications, such as payment application 129, executing under the host OS 128 and applications running on the POS device 110.

In some embodiments of the technology disclosed herein, a wallet application 125 executing under the host operating system 128 can perform a quality control check of payment application tags, process the tags, and construct the complete PPSE SELECT RESPONSE. The constructed PPSE SELECT RESPONSE is then communicated to a wallet applet 125 through an APDU named to indicate that little or no processing is required at the PPSE applet 126, for example, "DIRECT PPSE APDU." The wallet application 125 also can pass other bytes of information that can help the wallet applet 128 to update its own table of allowed payment AIDs quickly instead of parsing entire APDUs. The wallet applet 125 then passes this APDU content (which contains constructed "PPSE Select Response") to the PPSE applet 126 through an internal Java Card SIO Interface. The PPSE 126 receives the DIRECT PPSE RESPONSE APDU and directly sets it as the PPSE SELECT RESPONSE without the need for any further processing.

When the NFC reader 112 first establishes an NFC radio link 130 between the POS device 110 and the NFC target 120 to conduct a transaction, the NFC reader 112 transmits a PPSE SELECT command to the PPSE 126 through the NFC controller 122 in order to determine the payment options available on the NFC target 120. The PPSE 126 responds to the received PPSE SELECT command using the PPSE SELECT RESPONSE formatted under the host operating system 128. The NFC reader 112 can then determine which payment applications are both available and preferred by the user, and can, in cooperation with the NFC target 120 and the user, select a set of payment options to support the transaction.

Figure 5:
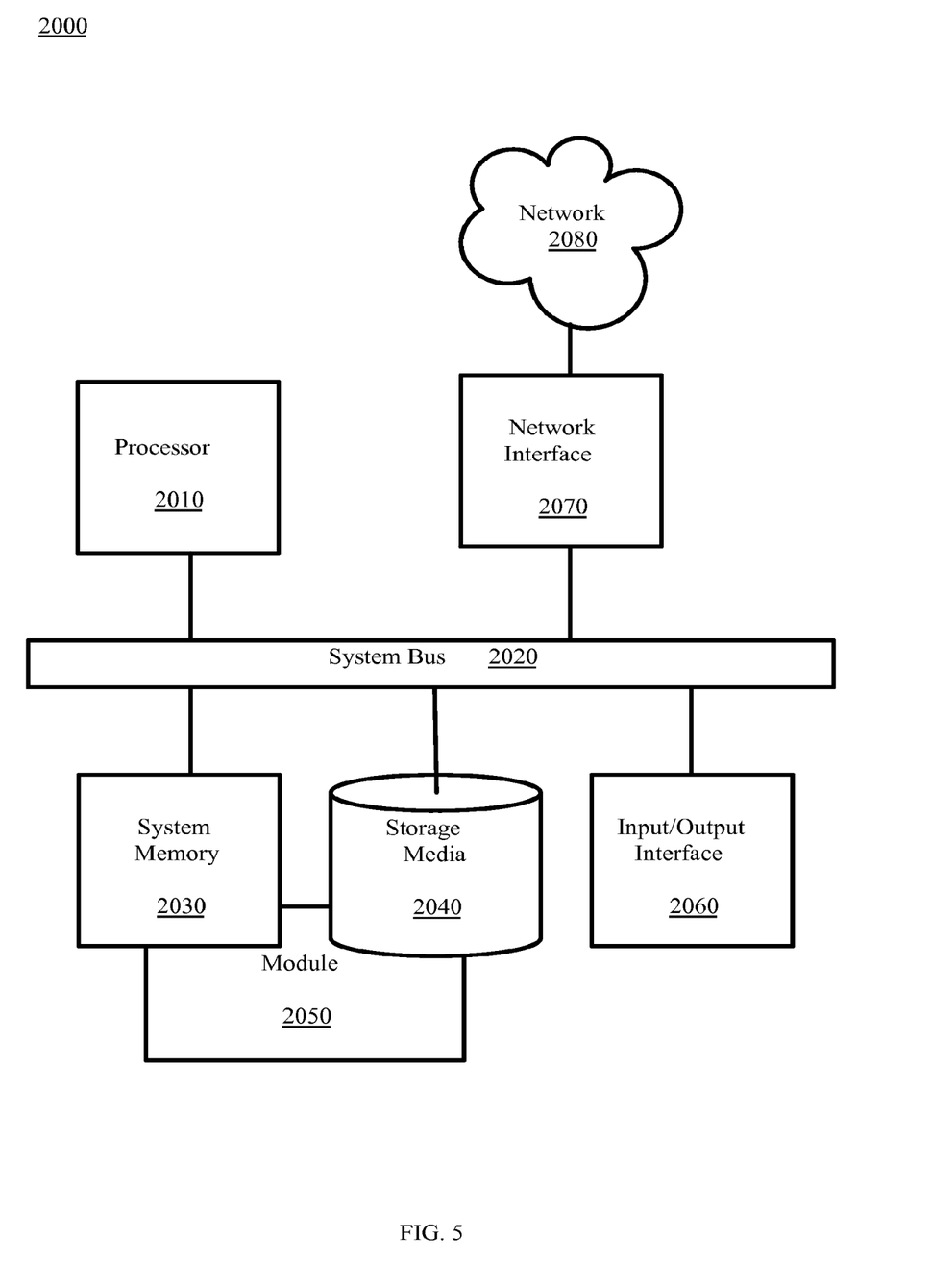
FIG. 5 is a block diagram depicting a computing machine and a module, in accordance with certain example embodiments.

In example embodiments, the devices associated with the technology presented herein may be any type of computing machine such as, but not limited to, those discussed in more detail with respect to FIG. 5. Furthermore, any modules associated with any of these computing machines, such as modules implementing the features described herein or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more other networks in addition to the NFC radio link 130 (for example, over the Internet for provisioning).

Example Processes

The example embodiments illustrated in the following figures are described hereinafter with respect to the components of the example operating environment and example architecture described elsewhere herein. The example embodiments may also be practiced with other systems and in other environments.

Figure 2:
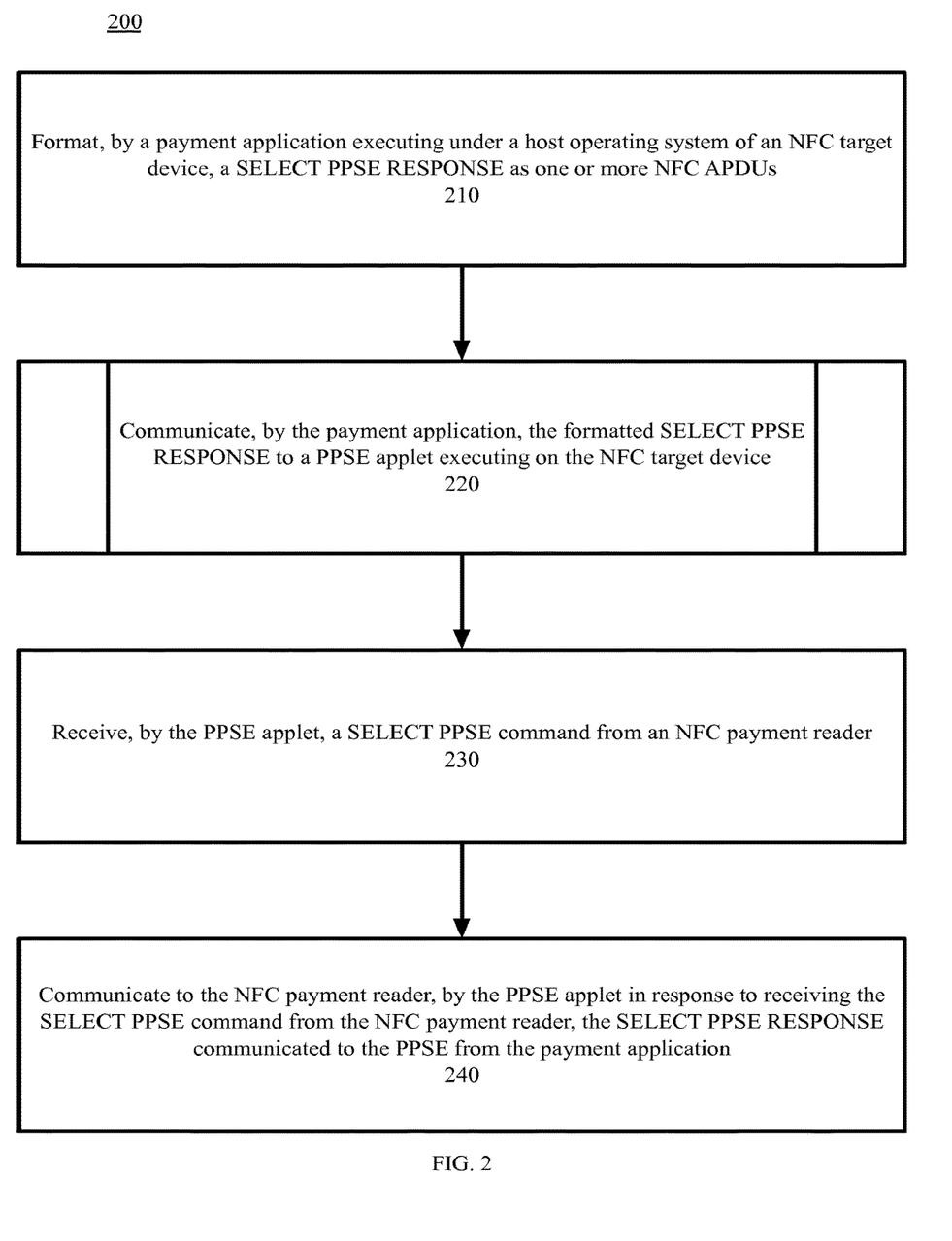
FIG. 2 is a block flow diagram depicting processes for informing an NFC reader of NFC-enabled target device payment application availability, in accordance with certain example embodiments.
Figure 3:
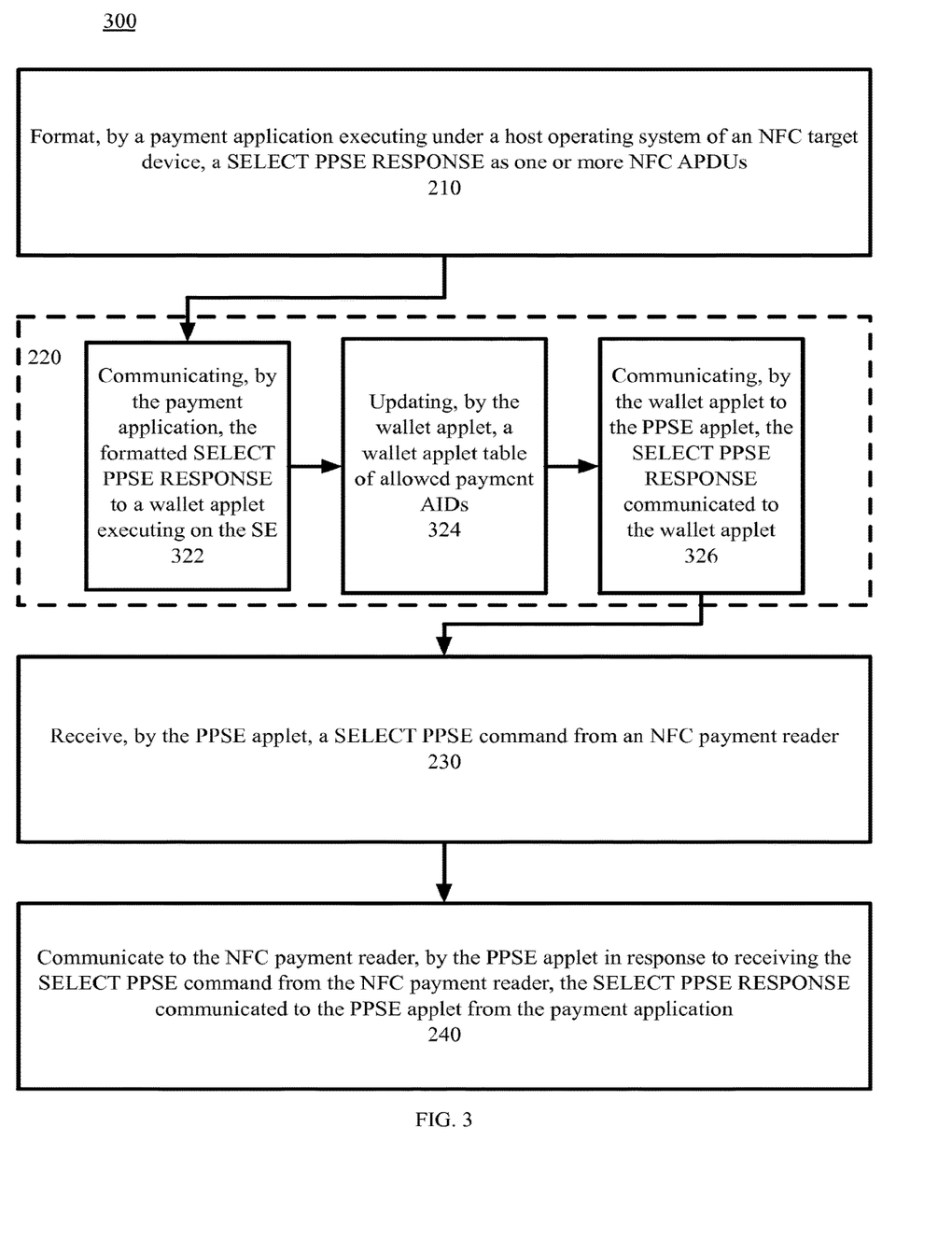
FIG. 3 is a block flow diagram depicting processes for informing an NFC reader of NFC-enabled target device payment application availability, in accordance with certain example embodiments.
Figure 4:
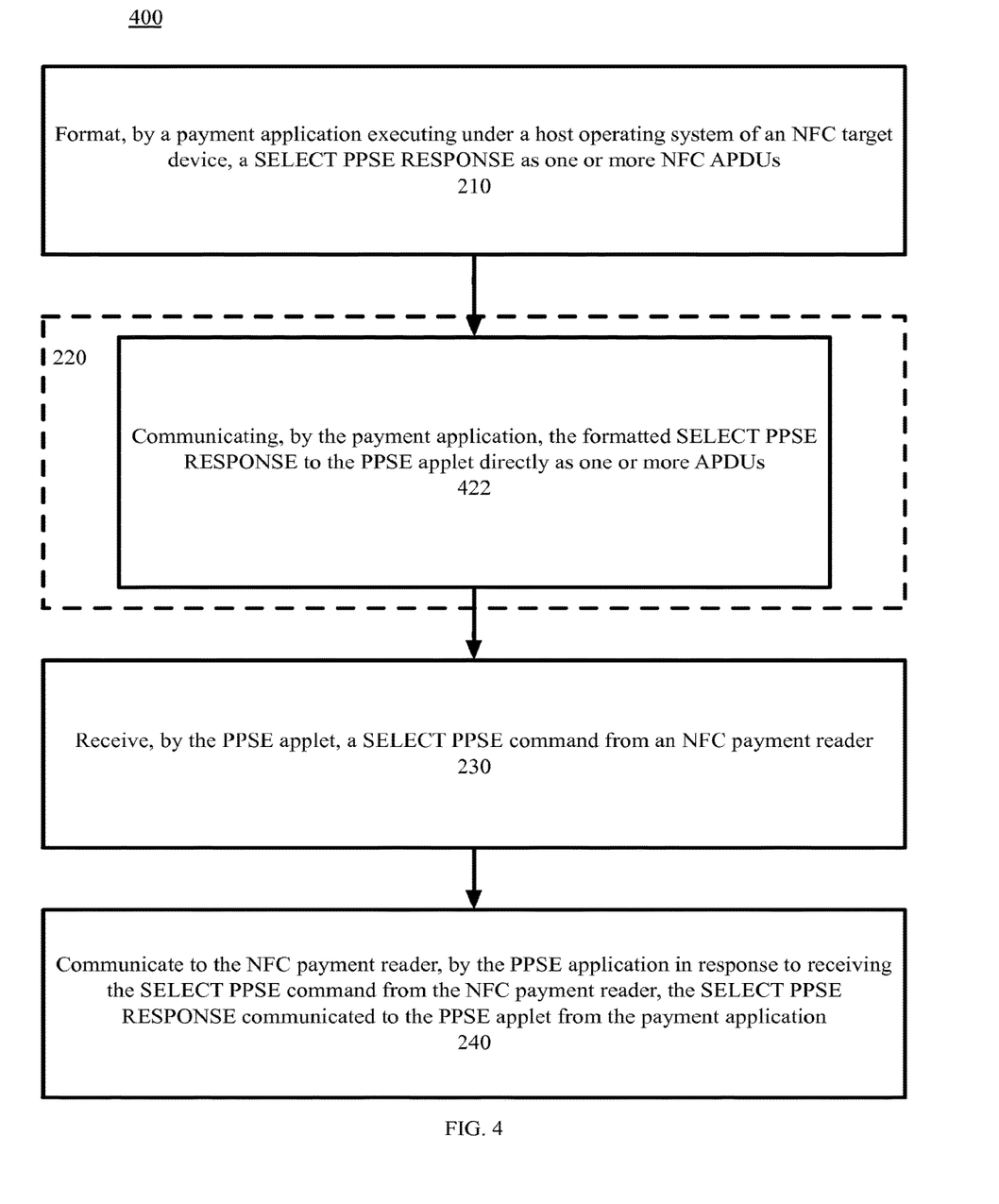
FIG. 4 is a block flow diagram depicting processes for informing an NFC reader of NFC-enabled target device payment application availability, in accordance with certain example embodiments.

The example methods illustrated in FIG. 2-4 are described hereinafter with respect to the components of the example operating environment 100. The example methods of FIG. 2-4 can also be performed with other systems and in other environments. The operations described with respect to any of the FIGS. 2-4 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, a block flow diagram depicting a method 200 to inform an NFC reader 112 of NFC-enabled target device 120 payment application availability is shown, in accordance with certain example embodiments. In such embodiments a payment application 129 (such as a wallet application) that executes under a host OS 128 of an NFC target device 120 (such as a smartphone) formats a SELECT PPSE RESPONSE as one or more NFC APDUs—Block 210. The payment application 129 formats the SELECT PPSE RESPONSE to respond to a SELECT PPSE command from an NFC payment reader 112. The SELECT PPSE RESPONSE includes a list of one or more AIDs corresponding to one or more payment options available on the NFC target device 120. In some embodiments, the NFC target device 120 can accept user input selection from among a plurality of payment options available on the NFC target device 120. The payment application 129 can format the SELECT PPSE RESPONSE based on the received user input. The user input can include a prioritization among a plurality of payment options available in connection with the payment application 129.

Consider, as a continuing example, a wallet application running on the host OS 128 of an NFC-enabled smartphone 120, in which the credentials for credit card A, store card B, and debit card C are stored. The user, via the wallet application, establishes a use priority of {C, A, B}. The wallet application can prepare one or more APDUs as a SELECT PPSE RESPONSE reflecting the AID of each card and the user-specified prioritization.

The payment application 129 can communicate the formatted SELECT PPSE RESPONSE to a PPSE applet 126 executing on the NFC target 120—Block 220. In the continuing application, the wallet application communicates APDUs specifying the prioritized set {C, A, B} to the PPSE applet 126 executing in the smartphone 120.

The PPSE applet 126 can receive, from an NFC payment reader 112, a SELECT PPSE command—Block 230. In the continuing example, the user brings the NFC-enabled smartphone 120 within NFC proximity of the POS device 110. The NFC reader 112 then detects the smartphone 120. The reader 112 initiates a communications channel between the reader 112 and the detected smartphone 120. The NFC reader 112 requests information regarding which NFC-enabled payment applications are available on the detected smartphone 120 using a SELECT PPSE command. The NFC controller 122 of the smartphone 120 receives the request, and passes the request to the PPSE applet 126.

The PPSE applet 126, in response to receiving the SELECT PPSE command from the NFC payment reader 112, responds to the NFC reader 112 with SELECT PPSE RESPONSE that was communicated to the PPSE applet 126 from the payment application 129—Block 240. In the continuing example, one or more APDUs describing the {C, A, B} availability and prioritization of payment options available on the NFC-enabled smartphone 120 are communicated from the PPSE 126 to the POS device 110 via the NFC controller 122 and the NFC reader 112.

In some embodiments of the present technology, the PPSE applet 126 executes in an SE 124 of the NFC target device 120. In the continuing example, since the PPSE applet 126 relies on a pre-formatted response from the wallet application 129, the latency between the NFC reader 112 transmitting the PPSE SELECT command and the NFC reader receiving the PPSE SELECT RESPONSE is mitigated over conventional approaches where the PPSE applet 126 must formulate the response.

Referring to FIG. 3, a block flow diagram depicting a method 300 to inform an NFC reader 112 of NFC-enabled target device 120 payment application 129 availability is shown, in accordance with certain example embodiments. In such embodiments Block 210, Block 230, and Block 240 can be performed as described above, with the PPSE applet 126 executing in an SE of the NFC target device 120. In such methods, the payment application 129 first communicates the formatted SELECT PPSE RESPONSE to a wallet applet 125 executing on the SE 124—Block 322. The wallet applet 125 performs an update to its own table of AIDs by parsing the APDUs communicated to it from the wallet application 129—Block 324. The wallet applet 125 communicates the formatted SELECT PPSE RESPONSE to the PPSE applet 126—Block 326. FIG. 3 shows the block wherein the wallet applet 125 performs its own update earlier in the block flow diagram than the block wherein the wallet applet 125 communicates the formatted SELECT PPSE RESPONSE to the PPSE applet 126. However, Block 324 and 326 can be performed in the opposite order, or independently—in part to introduce less latency into the process.

In some embodiments illustrated by FIG. 3, the wallet applet 125 communicates the SELECT PPSE RESPONSE to the PPSE applet 126 via a JAVA card sharable interface objects (SIO) interface between the wallet applet 125 and the PPSE applet 126.

Referring to FIG. 4, a block flow diagram depicting a method 400 to inform an NFC reader 112 of NFC-enabled target device 120 payment application 129 availability is shown, in accordance with certain example embodiments. In such embodiments Block 210, Block 230, and Block 240 can be performed as described above, with the PPSE applet executing in an SE of the NFC target device 120. In these embodiments the NFC target device 120 implements NFC Host Card Emulation (HCE) in the host operating system for the payment application 129. In such embodiments, the payment application 129 communicates the formatted SELECT PPSE RESPONSE to the PPSE applet 126 directly as one or more APDUs—Block 442. Such a direct write of the SELECT PPSE RESPONSE contributes to decreased latency in the process.

Other Example Embodiments

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area WAN, local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, while enabling embodiments have been described herein in the context of a reader and a mobile phone performing host-based card emulation, the principles can be applied to the peer-to-peer NFC operating mode.

I claim:

1. A computer-implemented method to inform near field communication (NFC) payment readers of NFC target device payment application availability, comprising:
   formatting, by a payment application executing under a host operating system of an NFC target device and outside a secure element (SE) of the NFC target device, a SELECT proximity payment system environment (PPSE) RESPONSE, the SELECT PPSE RESPONSE comprising a list of one or more Application Identifiers (AIDs) corresponding to one or more payment options available on the NFC target device;
   communicating, by the payment application, the formatted SELECT PPSE RESPONSE to a PPSE applet executing in the SE of the NFC target device;
   receiving, by the PPSE applet executing in the SE, a SELECT PPSE command from an NFC payment reader; and
   communicating to the NFC payment reader, by the PPSE applet executing in the SE, in response to receiving the SELECT PPSE command from the NFC payment reader, the SELECT PPSE RESPONSE communicated to the PPSE from the payment application.

2. The method of claim 1, wherein communicating the formatted SELECT PPSE RESPONSE to the PPSE applet comprises:
   communicating, by the payment application, the formatted SELECT PPSE RESPONSE to a wallet applet executing on the SE;
   updating, by the wallet applet, a wallet applet table of allowed payment AIDs; and
   communicating, by the wallet applet to the PPSE, the SELECT PPSE RESPONSE communicated to the wallet applet.

3. The method of claim 2, wherein communicating, by the wallet applet to the PPSE, the SELECT PPSE RESPONSE comprises, communicating the SELECT PPSE response via a JAVA card sharable interface objects (SIO) interface between the wallet applet and the PPSE applet.

4. The method of claim 1:
   wherein the NFC target device implements NFC Host Card Emulation (HCE) in the host operating system for the payment application; and
   wherein communicating, by the payment application, the formatted SELECT PPSE RESPONSE to a PPSE applet executing on the NFC target device comprises communicating the formatted SELECT PPSE RESPONSE to the PPSE applet directly as one or more Application Protocol Data Units (APDUs).

5. The method of claim 1, wherein formatting the SELECT PPSE response comprises receiving user input selection from among a plurality of payment options available on the NFC target device, and formatting the SELECT PPSE response based on the received user input.

6. The method of claim 5, wherein the received user input comprises a prioritization among a plurality of payment options available in connection with the payment application.

7. A computer program product, comprising:
   a non-transitory computer-readable storage device having computer-executable program instructions embodied thereon that when executed by a computer cause the computer to inform near field communication (NFC) readers of NFC target device payment application availability, the computer-executable program instructions comprising:
   computer-executable program instructions to format, by a payment application executing under a host operating system of an NFC-enabled target device and outside a secure element (SE) of the NFC target device, a SELECT proximity payment system environment (PPSE) RESPONSE, the SELECT PPSE RESPONSE comprising a list of one or more NFC Application Identifiers (AIDs) corresponding to one or more payment applications available on the NFC target device;
   computer-executable program instructions to communicate, by the payment application, the formatted SELECT PPSE RESPONSE to a PPSE applet executing in the SE of the NFC target device;
   computer-executable program instructions to receive, by the PPSE applet executing in the SE, a SELECT PPSE command from an NFC payment reader; and
   computer-executable program instructions to communicate to the NFC payment reader, by the PPSE applet executing in the SE, in response to receiving the SELECT PPSE command from the NFC payment reader, the SELECT PPSE RESPONSE communicated to the PPSE from the payment application.

8. The computer program product of claim 7, wherein computer-executable program instructions to communicate the formatted SELECT PPSE RESPONSE to the PPSE applet comprise:
   computer-executable program instructions to communicate, by the payment application, the formatted SELECT PPSE RESPONSE to a wallet applet executing on the SE;

computer-executable program instructions to update, by the wallet applet, a wallet applet table of allowed payment AIDs; and computer-executable program instructions to communicate, by the wallet applet to the PPSE, the SELECT PPSE RESPONSE communicated to the wallet applet.

9. The computer program product of claim 8, wherein computer-executable program instructions to communicate, by the wallet applet to the PPSE, the SELECT PPSE RESPONSE comprise computer-executable program instructions to communicate the SELECT PPSE response via a JAVA card serial input/output (SIO) interface between the wallet applet and the PPSE applet.

10. The computer program product of claim 7:
   wherein the NFC target device implements NFC Host Card Emulation (HCE) in the host operating system for the payment application; and
   wherein computer-executable program instructions to communicate the formatted SELECT PPSE RESPONSE to a PPSE applet executing on the NFC target device comprise computer-executable program instructions to communicate the formatted SELECT PPSE RESPONSE to the PPSE applet directly as one or more Application Protocol Data Units (APDUs).

11. The computer program product of claim 7, wherein computer-executable program instructions to format the SELECT PPSE response comprise:
   computer-executable program instructions to receive user input selection from among a plurality of payment options, and
   computer-executable program instructions to format the SELECT PPSE response based on the received user input.

12. The computer program product of claim 11, wherein the received user input comprises a prioritization among a plurality of payment options available in connection with the payment application.

13. A system to inform near field communication (NFC) readers of NFC target device payment application availability, comprising:
   a storage device; and
   a processor communicatively coupled to the storage device, wherein the processor executes application code instructions that are stored in the storage device to cause the system to:
      format, by a payment application executing under a host operating system of an NFC target device and outside a secure element (SE) of the NFC target device, a SELECT proximity payment system environment (PPSE) RESPONSE, the SELECT PPSE RESPONSE comprising a list of one or more NFC Application Identifiers (AIDs) corresponding to one or more payment applications available on the NFC target device;
      communicate, by the payment application, the formatted SELECT PPSE RESPONSE to a PPSE applet executing in the SE of the NFC target device;
      receive, by the PPSE applet executing in the SE, a SELECT PPSE command from an NFC payment reader; and
      communicate to the NFC payment reader, by the PPSE applet executing in the SE, in response to receiving the SELECT PPSE command from the NFC payment reader, the SELECT PPSE RESPONSE communicated to the PPSE from the payment application.

14. The system of claim 13, wherein the application code instructions that are stored in the storage device to cause the system to communicate the formatted SELECT PPSE RESPONSE to the PPSE applet comprise:
   application code instructions that are stored in the storage device to cause the system to communicate, by the payment application, the formatted SELECT PPSE RESPONSE to a wallet applet executing on the SE;
   application code instructions that are stored in the storage device to cause the system to update, by the wallet applet, a wallet applet table of allowed payment AIDs; and
   application code instructions that are stored in the storage device to cause the system to communicate, by the wallet applet to the PPSE, the SELECT PPSE RESPONSE communicated to the wallet applet.

15. The system of claim 14, wherein computer-executable program instructions to communicate, by the wallet applet to the PPSE, the SELECT PPSE RESPONSE comprise computer-executable program instructions to communicate the SELECT PPSE response via a JAVA card serial input/output (SIO) interface between the wallet applet and the PPSE applet.

16. The system of claim 13:
   wherein the NFC target device implements NFC Host Card Emulation (HCE) in the host operating system for the payment application; and
   wherein computer-executable program instructions to communicate the formatted SELECT PPSE RESPONSE to a PPSE applet executing on the NFC target device comprise computer-executable program instructions to communicate the formatted SELECT PPSE RESPONSE to the PPSE applet directly as one or more Application Protocol Data Units (APDUs).

17. The system of claim 13, wherein computer-executable program instructions to format the SELECT PPSE response comprise:
   computer-executable program instructions to receive user input selection from among a plurality of payment options, and
   computer-executable program instructions to format the SELECT PPSE response based on the received user input.

* * * * *